(12) United States Patent
Lee

(10) Patent No.: US 10,664,647 B2
(45) Date of Patent: May 26, 2020

(54) VISUAL WEB PAGE ANALYSIS SYSTEM AND METHOD

(71) Applicant: Kuang-Yao Lee, Richardson, TX (US)

(72) Inventor: Kuang-Yao Lee, Richardson, TX (US)

( * ) Notice: Subject to any disclaimer, the term of this patent is extended or adjusted under 35 U.S.C. 154(b) by 0 days.

(21) Appl. No.: 14/525,282

(22) Filed: Oct. 28, 2014

(65) Prior Publication Data

US 2016/0117292 A1    Apr. 28, 2016

(51) Int. Cl.
| | | |
|---|---|---|
| *G06F 17/10* | (2006.01) | |
| *G06F 40/14* | (2020.01) | |
| *G06K 9/00* | (2006.01) | |
| *G06F 16/957* | (2019.01) | |

(52) U.S. Cl.
CPC .......... *G06F 40/14* (2020.01); *G06F 16/9577* (2019.01); *G06K 9/00469* (2013.01); *G06T 2207/30* (2013.01)

(58) Field of Classification Search
CPC .................................................. G06F 17/212
See application file for complete search history.

(56) References Cited

U.S. PATENT DOCUMENTS

| | | | | |
|---|---|---|---|---|
| 6,014,679 A * | 1/2000 | Tomioka | ............... | G06F 16/954 715/201 |
| 6,226,407 B1 * | 5/2001 | Zabih | ..................... | G06T 7/001 382/209 |
| 6,373,985 B1 * | 4/2002 | Hu | ..................... | G06K 9/00469 382/229 |
| 6,470,094 B1 * | 10/2002 | Lienhart | ................ | G06K 9/325 382/171 |
| 6,473,522 B1 * | 10/2002 | Lienhart | ................ | G06K 9/325 382/164 |
| 2007/0130525 A1 * | 6/2007 | Murphy | ................ | G06F 3/0485 715/747 |
| 2010/0290701 A1 * | 11/2010 | Puneet | ..................... | G06K 9/38 382/164 |
| 2014/0068553 A1 * | 3/2014 | Balasubramanian | ..... | G06F 8/34 717/109 |
| 2014/0372873 A1 * | 12/2014 | Leung | .................. | G06F 16/958 715/243 |

(Continued)

FOREIGN PATENT DOCUMENTS

| | | | |
|---|---|---|---|
| CN | 102236658 A | 11/2011 | |
| CN | 102799638 A | 11/2012 | |
| EP | 2293251 A1 * | 3/2011 | ............. G06T 11/60 |

OTHER PUBLICATIONS

Sun et al., DOM Based Content Extraction via Text Density, SIGIR'11, Jul. 24-28, 2011.*

(Continued)

*Primary Examiner* — Shahid K Khan
(74) *Attorney, Agent, or Firm* — Bacon & Thomas, PLLC

(57) ABSTRACT

A visual web page analysis system includes an image analyzing unit, a block analyzing unit, a vision identifying unit, and an output unit. The image analyzing unit loads information of a web page and segments content of the web page into a plurality of blocks based on a visual feature. The block analyzing unit classifies the blocks based on an attribute of each block. The vision identifying unit compares at least a relative feature of each block to determine a function of each block on the web page. The output unit collects the blocks and their functions into an information interface and outputs the information interface.

20 Claims, 8 Drawing Sheets

(56) References Cited

U.S. PATENT DOCUMENTS

2015/0242684 A1* 8/2015 Arad ................ G06K 9/00456
382/176

OTHER PUBLICATIONS

Yang et al, Web Content Information Extraction Approach Based on Removing Noise and Content-Features, 2010 International Conference on Web INformation Systems and Mining (Year: 2010).*

* cited by examiner

VISUAL WEB PAGE ANALYSIS SYSTEM AND METHOD

BACKGROUND OF THE INVENTION

1. Field of the Invention

The present invention relates to a web page analysis system and, more particularly, to a visual web page system and method for analyzing a web page based on vision.

2. Description of Related Art

Browsing web pages has become a habit in daily life, but the data items of a web page are numerous and complex and always are not organized, resulting in problems about reading and integrating the data. There are some methods provided to search data on a web page or used to catch the data with a particular format, but the effects are usually unsatisfactory.

Current techniques for catching or searching web page data are mostly executed by a computer for loading the web page data (e.g. HTML, DOM . . . etc), and using keywords to search and catch the data related to the keywords. Unfortunately, such techniques are limited due to difficulty in words analysis, resulting in an inaccurate result.

Some existing web page analysis techniques make use of vision data, but most of them are limited to catch a single type of data rather than all data of the web page, so they lack for extensive applicability. Therefore, it is desired to have an improved visual web page analysis system and method to solve the aforementioned problems.

SUMMARY OF THE INVENTION

The object of the invention is to provide a visual web page system and method for analyzing the whole content of a web page based on vision.

In accordance with one aspect of the invention, there is provided a visual web page analysis system for analyzing data of a web page based on vision. The system comprises: an image analyzing unit for loading information of a web page and segmenting content of the web page into a plurality of blocks based on at least a visual feature of the web page; a block analyzing unit for classifying the plurality of blocks based on at least an attribute of each block; an vision identifying unit for comparing at least a relative feature of each block to determine a function of each block on the web page; and an output unit for collecting the plurality of blocks and their functions into an information interface and outputting the information interface, wherein the image analyzing unit, the block analyzing unit, the vision identifying unit and the output unit are executed by a processor to provide an analyzed result shown on the information interface.

In accordance with another aspect of the invention, there is provided a visual web page analysis method executed by a processor for analyzing data of a web page based on vision. The method comprises the steps of: (a) loading information of a web page; (b) segmenting content of the web page into a plurality of blocks based on at least a visional feature of the web page; (c) classifying the plurality of blocks based on at least an attribute of each block; (d) comparing at least a relative feature of each block to determine a function of each block on the web page; and (e) collecting the plurality of blocks and their functions into an information interface, and outputting the information interface.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
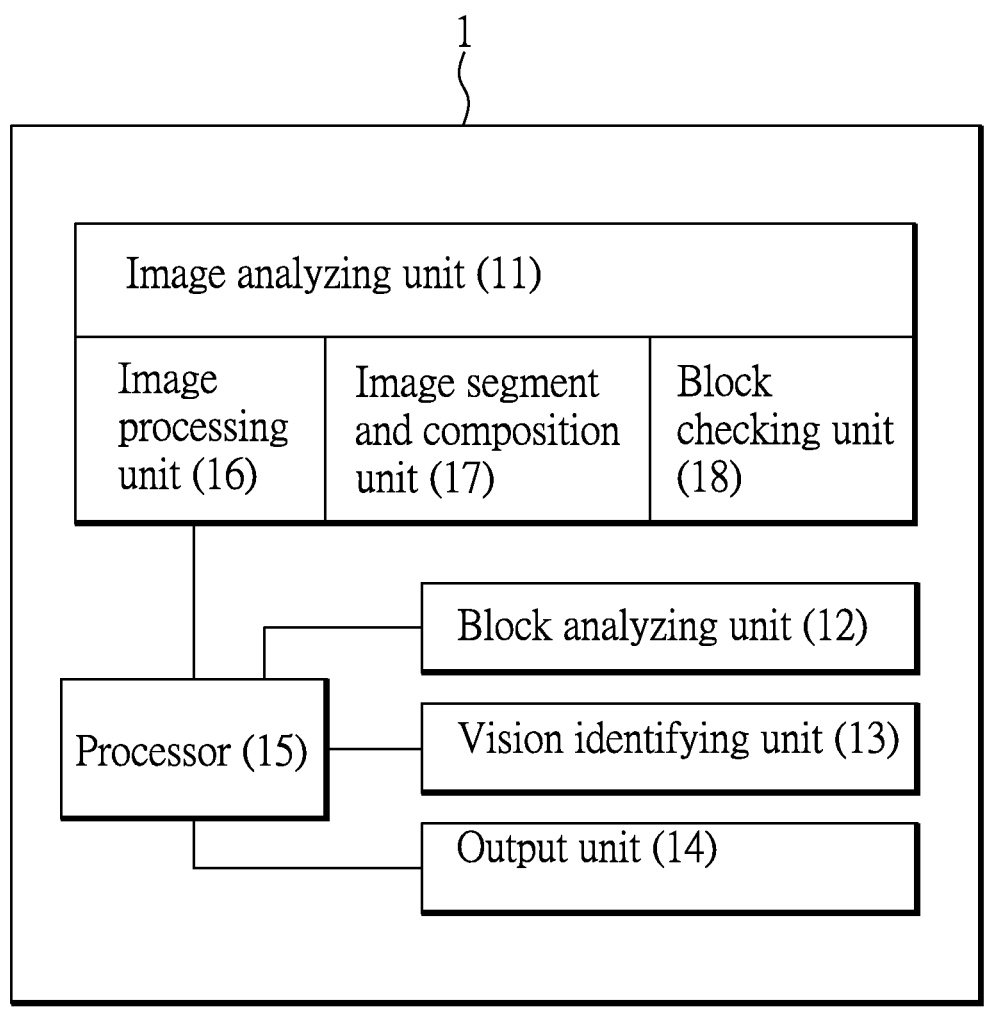
FIG. 1 is a schematic diagram of a visual web page analysis system according to the invention.

FIG. 1 is a schematic diagram of a visual web page analysis system 1 for analyzing data of a web page based on vision according to the invention. The visual web page analysis system 1 comprises an image analyzing unit 11, a block analyzing unit 12, a vision identifying unit 13 and an output unit 14. Furthermore, in the visual web page analysis system 1, there is provided a processor 15 connected to the image analyzing unit 11, the block analyzing unit 12, the vision identifying unit 13 and the output unit 14 for controlling the executions of these units. Preferably, these units can be a plurality of major programs, each major program being executed in a computer, or can be a plurality of subprograms connected to each other, and these units also can be hardware devices with executable programs connected to a computer for operation.

The image analyzing unit 11 is used to load information of a web page, and to segment the web page into a plurality of blocks based on at least a visual feature of the webpage. The image analyzing unit 11 further comprises an image processing unit 16 and an image segment and composition unit 17. The image processing unit 16 is used to execute an image processing to distinguish texts and pictures from the web page, and the image segment and composition unit 17 is used to compose the texts and pictures with a related visual feature to a block based on relation levels of the texts and the pictures, thereby segmenting the web page into a plurality of blocks. The image analyzing unit 11 can further comprise a block checking unit 18 used to check whether segmentations of the blocks are correct or not.

The image analyzing unit 11 segments the web page into the blocks, and the block analyzing unit 12 is used to classify the blocks in accordance with attributes of each block, e.g. does the block with a hyperlink? or the block is just a text/picture only. The vision identifying unit 13 is used to identify functions of each block in the web page, for example, identifying that the block is for advertising or navigating. The output unit 14 is used to output the data and functions of the blocks.

Figure 2:
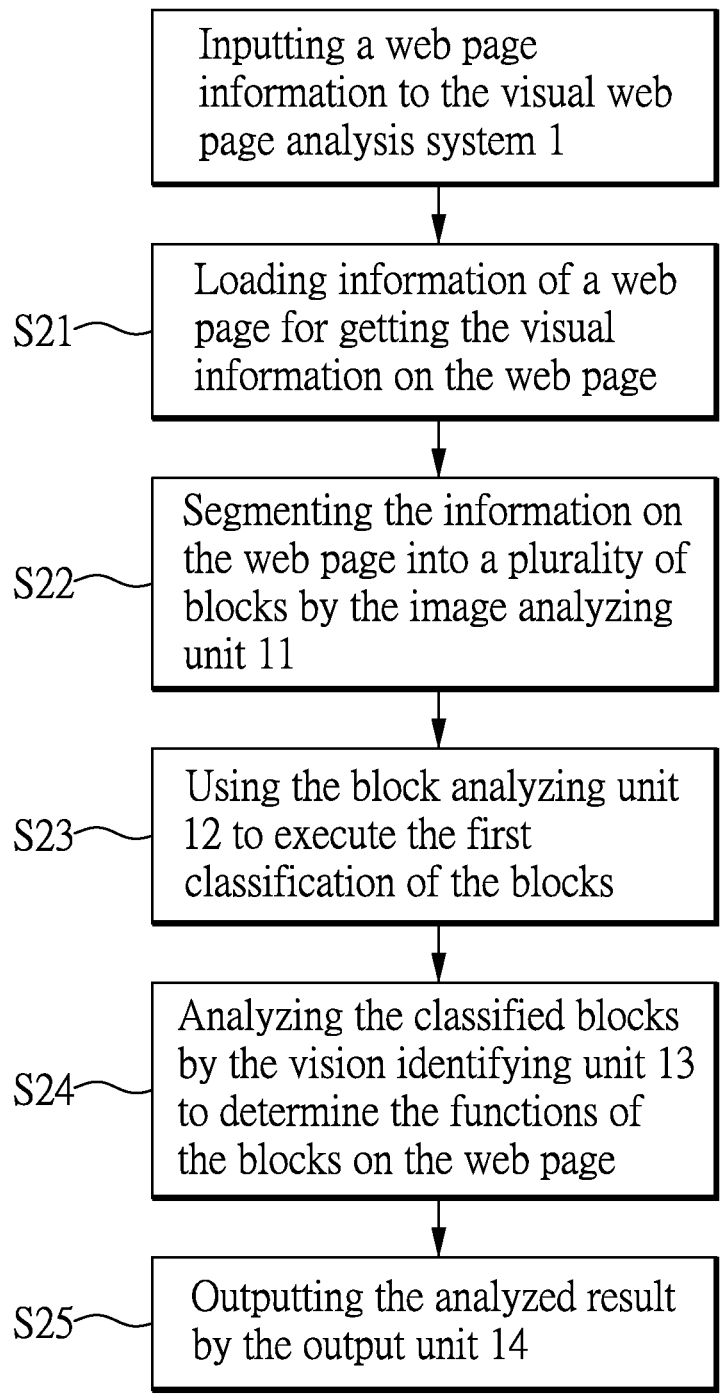
FIG. 2 is a main flow chart of the visual web page analysis method according to an embodiment of the invention.

FIG. 2 is a main flow chart of the visual web page analysis method according to an embodiment of the invention. In this embodiment, the visual web page analysis method is used in the visual web page analysis system 1 as shown in FIG. 1 and executed by the processor 15. First, step S21 is executed such that the visual web page analysis system 1 can load information of a web page for getting the visual information on the web page. Next, step S22 is performed for segmenting the information on the web page into a plurality of blocks by the image analyzing unit 11. Then, step S23 is performed for using the block analyzing unit 12 to execute the first classification of the blocks. Subsequently, step S24 is performed for analyzing the classified blocks by the vision identifying unit 13 to determine the functions of the blocks on the web page. Finally, step S25 is performed for outputting the analyzed result by the output unit 14. The detail of each step is further discussed in the following.

In step S21, it is preferred that the system 1 receives web page information from an external input, and the information can be a real web page, a URL of a web page, even a batch file with list of URLs; i.e. the system 1 can be arranged to get the web page information by connecting to internet or by the browser, but the invention is not limited to it. More specifically, the system 1 can get the information of the web page by a web browser, or the system 1 gets a web site first, and then transmits an instruction to the browser for connecting to the web page, so as to obtain the information. In this embodiment, the system 1 is preferred to use the image analyzing unit 11 to obtain the information, but the invention is not limited to it.

Figure 3:
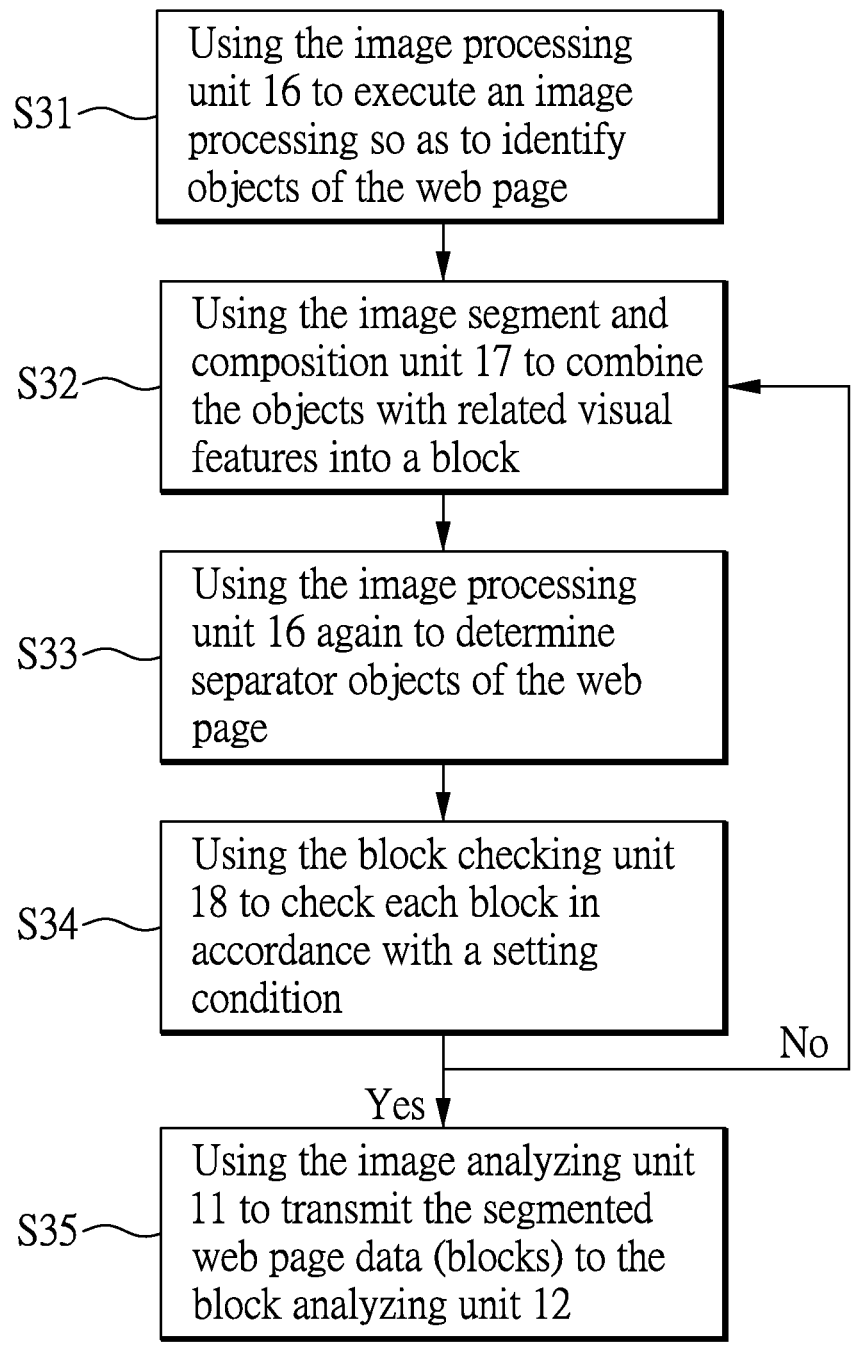
FIG. 3 is a detailed flow chart of step S22 of FIG. 2.
Figure 4:
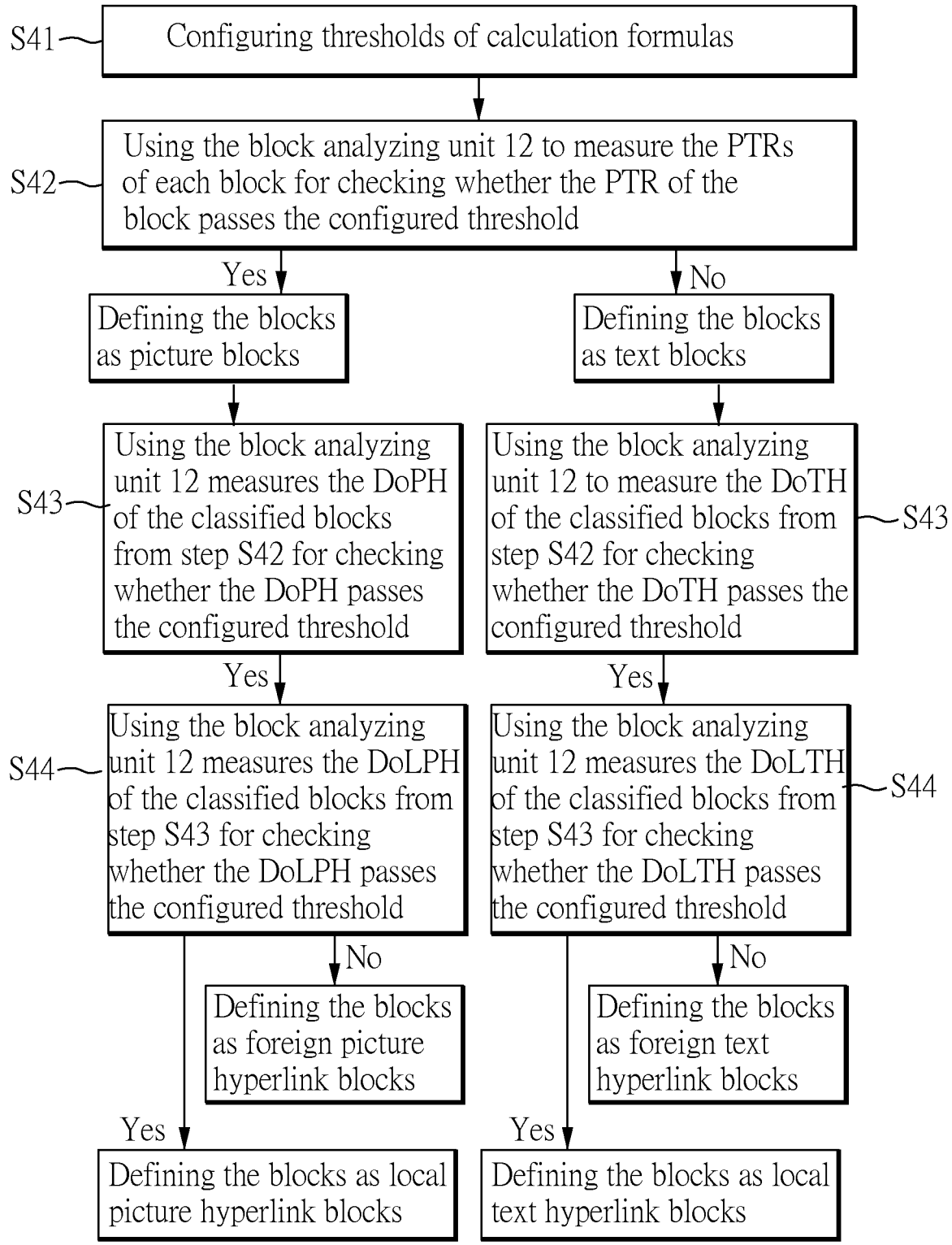
FIG. 4 is a detailed flow chart of step S23 of FIG. 2.

Step S22 is used to segment the web page into a plurality of blocks by the image analyzing unit 11. FIG. 3 is a detailed flow chart of step S22. With reference to FIG. 3 and FIG. 4, step S31 is performed at first for using the image processing unit 16 of the image analyzing unit 11 to execute an image processing so as to identify objects of the web page (e.g. texts or pictures), wherein the image processing can be an edge detection technique, an optical character recognition technique, computer vision technique, or image segmentation technique . . . etc., and is executed by an algorithm to identify features of the web page, e.g. number of texts, sizes of texts, color of texts, pictures, blank regions of the web page, background color or separator line, etc., and each feature is deemed as a visional feature.

Then, step S32 is performed, with which the image segment and composition unit 17 of the image analyzing unit 11 combines the objects with related visual features into a block, so that the web page can be divided into a plurality of blocks, wherein the associate level of the visual features is defined as the positions of the objects, colors of the objects, size of the objects, patterns of the objects, distance between the objects, sizes of blank space regions or a background color, or a combination of the aforementioned definitions. Thus, mistakes generated during composition of the blocks can be reduced; for example, two objects with a far distance will not be combined to a block.

Then, step S33 is performed, with which the image analyzing unit 11 uses the image processing unit 16 again to determine separator objects of the web page, e.g. horizontal line, color separator line, or continuous blank portion of the web page, etc., and then analyzes whether the separator objects cross the blocks or not and, if yes, the image analyzing unit 11 uses the image segment and composition unit 17 to segment the crossed blocks again.

Then, step S34 is performed, with which the block checking unit 18 of the image analyzing unit 11 checks each block in accordance with a setting condition. If it finds a block failing to satisfy the setting condition, the image segment and composition unit 17 returns to step S33 to segment the block again, wherein the setting condition is a predetermined condition configured by user, e.g. the sizes of the blocks, but not limited to it.

Besides, in another embodiment of step S34, except that the block checking unit 18 checks whether the dividing is correct according to the setting condition, the image segment and composition unit 17 can also use the horizontal lines, separator lines or continuous blank portion of the web pages to combine the blocks. For example if there is no any separator line between the two blocks, and the sizes of two blocks satisfy the setting condition, the image segment and composition unit 17 can combine the two blocks.

In addition, the step S34 can also be configured to receive a user instruction from an outer part to execute the checking and the dividing after steps S32 and S33. For example, the blocks can be checked by the user and the user can send some instructions to the image segment and composition unit 17 after the checking, and then the image segment and composition unit 17 executes dividing or combining action according to the instructions. On the other hand, the situations of the dividing blocks can completely be decided by the user.

Then, step S35 is executed, with which the image analyzing unit 11 transmits the segmented web page data (blocks) to the block analyzing unit 12. Besides, the image analyzing unit 11 also can arrange the blocks before transmitting it to the block analyzing unit 12, and the arrangement is preferred to arrange the blocks form a level type which can be read by the block analyzing unit 12, e.g. a block tree information, while the block tree information can also be outputted to the user by the output unit 14.

FIG. 4 is a detailed flow chart of step S23. The block analyzing unit 12 basically analyzes the blocks to assist in determining basic functionalities of the blocks based on at least an attribute, and the results of this step are used for further analysis, so as to provide more accurate analysis results.

In this step, the block analyzing unit 12 executes an analysis to calculate levels of each attribute of each block, so as to determine the attribute of each block in accordance with the following formulas for Degree of Text Hyperlink (DoTH), Degree of Picture Hyperlink (DoPH), Text Ratio, Picture Text Ratio (PTR), Degree of Local Text Hyperlink (DoLTH), and Degree of Local Picture Hyperlink (DoLPH):

Degree of Text Hyperlink (DoTH)=(number of text hyperlink in the block)/(number of text tag in the block), wherein the text tag is grammar of HTML which is any grammar instruction that can be used to present texts, e.g. <h1>, <p> . . . etc. Those skilled in the art can understand that the system can get the number of text tag when it gets the information of the web page. Besides, the text hyperlink is a hyperlink presented by text type; for example, "back to homepage" is a text hyperlink. The Degree of Text Hyperlink is used to present the percentage of text hyperlinks among all texts in the block, and the higher degree means more text hyperlinks in the block.

Degree of Picture Hyperlink (DoPH)=(number of picture hyperlink in the block)/(number of picture tag in the block), wherein the picture tag is grammar of HTML which is any grammar instruction that can be used to present pictures, e.g. <img>, <canvas> . . . etc. Besides, the picture hyperlink is a hyperlink presented by picture type. The Degree of Picture Hyperlink is used to present the percentage of picture hyperlinks among all pictures in the block.

Text Ratio=(number of character in the block)/(number of character in the web page), wherein the number of character is number of text; e.g. the number of character of "character" is 9. The Text Ratio is used to present the ratio of the number of characters in the block between all characters in the web page, and the block is more important in the web page if the ratio is higher.

Picture Text Ratio (PTR)=(number of image tag in the block)/(number of text tag in the block),
wherein the PTR is used to measure pictures verse texts ratio in the block, while the PTR being high means the block with high percentage of pictures.

Degree of Local Text Hyperlink (DoLTH)=(number of local text hyperlink in the block)/(number of text hyperlink in the block),
wherein the Local Text Hyperlink means that the text hyperlinks are linked to the same web domain; for example, Yahoo NEWS and Yahoo Shopping are belonged to the same web domain.

Degree of Local Picture Hyperlink (DoLPH)=(number of local picture hyperlink in the block)/(number of picture hyperlink in the block),
wherein the Local Picture Hyperlink means that the picture hyperlinks are linked to the same web domain.

After defining the formulas, step S41 is performed, with which the formulas are respectively configured with a threshold. It is appreciated that the formulas are measured by the block analyzing unit 12 executing programs, or the block analyzing unit 12 is provided with the algorithms of the formulas for execution.

Then, step S42 is performed, with which the block analyzing unit 12 measures the PTRs of each block to check whether the PTR of the block passes the configured threshold and, if yes, the block is classified as a picture block; otherwise it is classified as a text block.

Then, step S43 is performed, with which the block analyzing unit 12 measures the DoTH or DoPH of the classified blocks from step S42. If the block is text block, the block analyzing unit 12 measures the DoTH, otherwise, measures the DoPH. If the DoTH or DoPH of the block is over the threshold, the block is classified as a text hyperlink block or a picture hyperlink block.

Then, step S44 is performed, with which the block analyzing unit 12 measures the DoLTH or DoLPH of the classified blocks from step S43. If the block is text block, the block analyzing unit 12 measures the DoLTH, otherwise, measures the DoLPH. If the DoLTH or DoLPH of the block is over the threshold, the block is classified as a local text hyperlink block or a local picture hyperlink block; otherwise, the block is classified as a foreign text hyperlink block or a foreign picture hyperlink block.

In other embodiments, more determinations of HTML tags can be used in the invention. For example, an exist of a tag "<input>=inputbox" can be used to determine whether the block is a inputbox, an exist of a tag "<select>=dropdown menu" can be used to determine whether the block is a dropdown menu, or if there is no HTML tag in the block, the block will be determined as a noise block with a little information.

After completing step S44, the blocks can be preliminary classified, and the preliminarily classified results can be used in subsequent steps to assist the vision identifying unit 13 in analyzing functions of the blocks.

Figure 5:
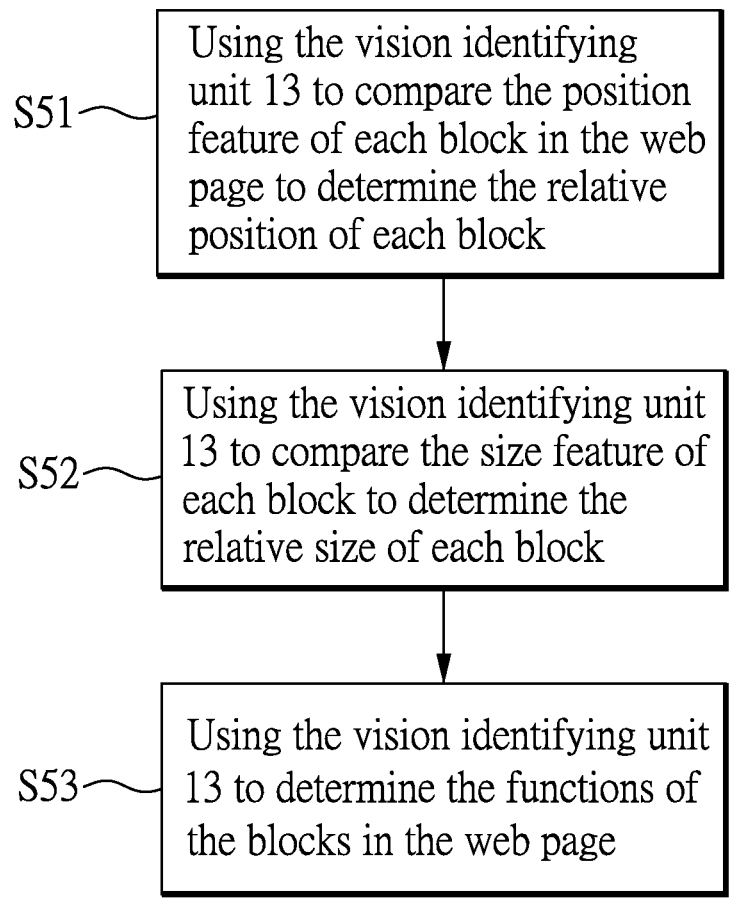
FIG. 5 is a detailed flow chart of step S24 of FIG. 2.

FIG. 5 is a detailed flow chart of step S24, with which the vision identifying unit 13 compares at least a relative feature of each block to determine function of each block on the web page, wherein the functions are preferred to be classifies into main content, support content, advertisement and navigation functions.

First, step S51 is performed, with which the vision identifying unit 13 compares the position feature of each block in the web page to determine the relative position of each block. The relative positions can be classified into a relative center position, a relative edge position or a relative side position of the web page. Due to the important main contents being usually located at the center of a web page, the advertisements being located at the edge, and the navigation menus being located at two sides of the web page, this step applies the block positions as the determined basis.

Then, step S52 is performed, with which the vision identifying unit 13 compares the size feature of each block to determine the relative size of each block. Because a bigger block is usually composed by the main content, and a smaller block is composed by the advertisement or navigation menu, this step applies the block sizes as the determined basis.

Then, step S53 is performed, with which the vision identifying unit 13 determines the functions of the blocks in the web page. If the block is relatively big and is located at the relative center position of the web page, the block is defined as the main content block by the vision identifying unit 13. Besides, if the block with high TR is located at the top position of the web page, the block can also be defined as the main content block. If the block is smaller than the main content block, and is located at edge of the web page, the block is defined as the advertisement block. If the block is vertically located at the left or right side of the web page or is horizontally located at the top or bottom of the web page, the block is defined as the navigation menu block.

Figure 6:
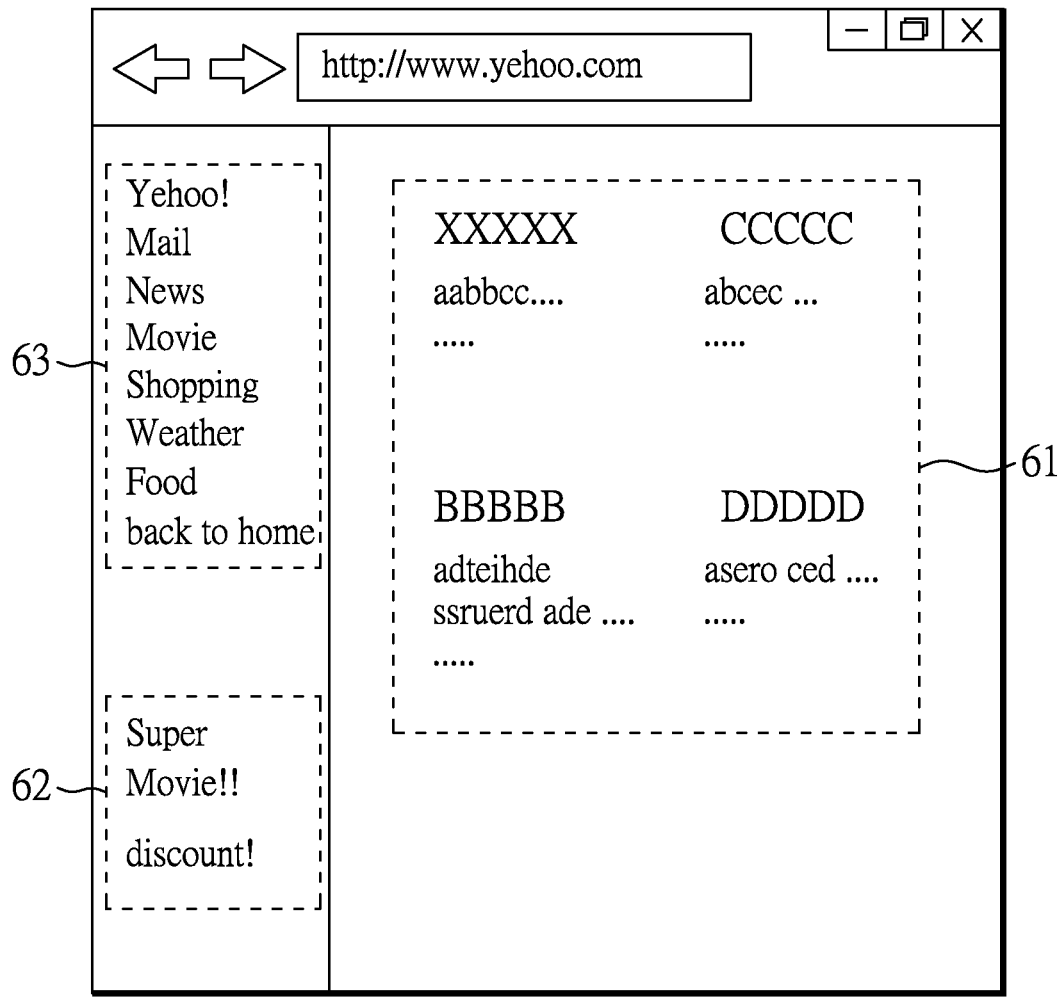
FIG. 6 is a schematic diagram of web blocks on a web page according to an embodiment of the invention.

In addition, the vision identifying unit 13 can apply different features for determination. According to another embodiment, the vision identifying unit 13 compares data appearance feature of each block to determine the relative appearance type of each block. Typically, the fonts and font sizes are similar for the texts in the main content block. As shown in FIG. 6 which is a schematic diagram of a web page, the fonts and font sizes of a main content block 61 are the same. For distinguishing from the main content block, the advertisement block usually has different fonts or font sizes in comparison with the main content block, e.g. an advertisement block 62 as shown in FIG. 6. The navigation menu block usually has similar fonts or font sizes in comparison with the main content block. In order to distinguish the navigation menu block from the main content block, this embodiment can be combined with step S51 or S52 to distinguish the navigation menu block from the main content block. As the navigation menu block 63 shown in FIG. 6, it has similar fonts and same sizes, and is located at the left side of the web page. Therefore, this embodiment can be used to accurately determine the functions of the blocks in the web page.

In another embodiment, the vision identifying unit 13 can also analyze the functions of the blocks by a pattern recognition method, wherein the pattern recognition method is employed to compare the layouts of the objects of the web. For example, a navigation menu is usually composed by a plurality of objects with relative visional characteristics, wherein the objects regularly arranged on the web. Thus, a block with a series of texts with same size and color alternately arranged on the web will be determined as a navigation menu.

So it has been known that the vision identifying unit 13 can determine the functions of the blocks based on the positions of the blocks, the sizes of the blocks, the layouts of the objects of the blocks, the colors or sizes of the objects of the blocks . . . etc. The above-mentioned description of determination is for illustrative purpose only.

Then, the output unit 14 collects the blocks and the functions of the blocks into an information interface, and outputs the information interface to the user. The information interface is preferred to be an HTML or a picture format, but it can also be other file formats.

As a result, the visual web page analysis system and method of the present invention can be used to analyze the data of web page and its functions based on visual habits of the user, and to improve the accuracy of the analysis, so as to achieve the analysis of the whole web page, thereby allowing the analysis to have extensive applicability.

Figure 7:
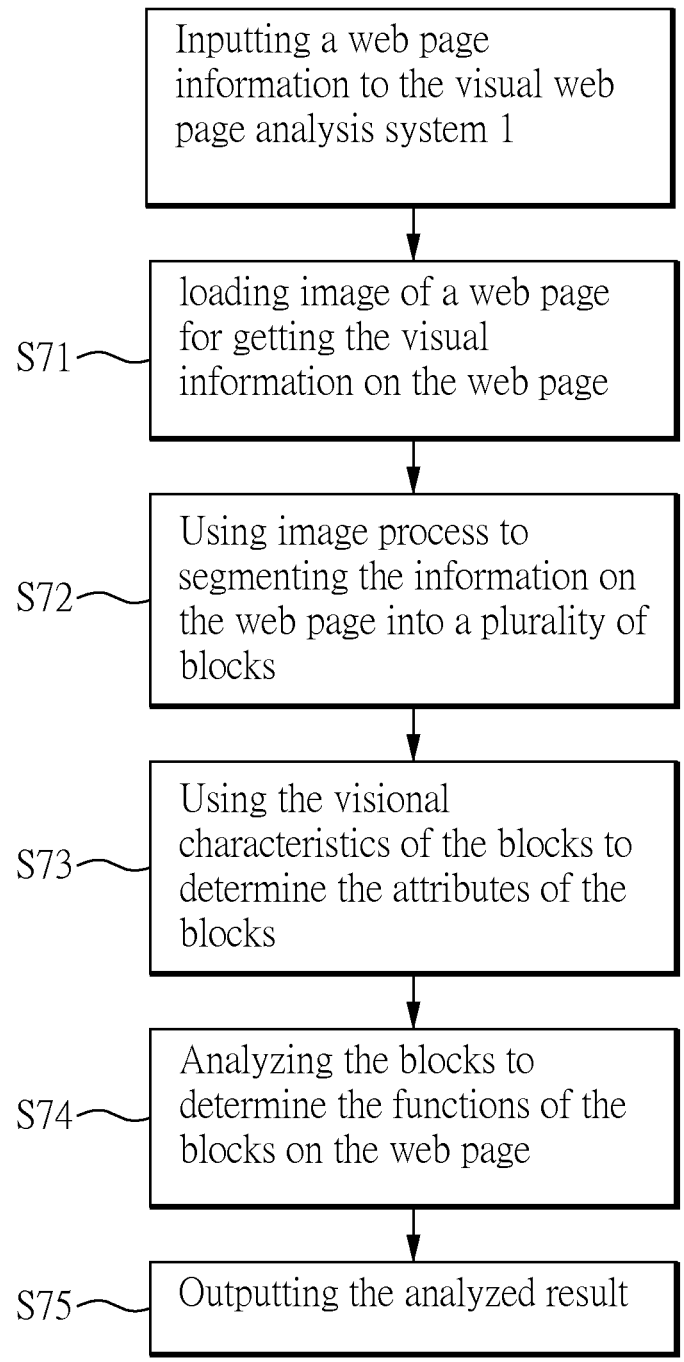
FIG. 7 is a flow chart of a visual web page analysis method according to another embodiment of the invention.

FIG. 7 is a flow chart of a visual web page analysis method according to another embodiment of the invention. In this embodiment, the visual web page analysis method is used in the visual web page analysis system 1 as shown in FIG. 1 and is executed by the processor 15. In this method, step S71 is first performed such that the visual web page analysis system 1 can load information of a web page for getting the visual information on the web page. Then, step S72 is performed for segmenting the information on the web page into a plurality of blocks by the image analyzing unit 11. Then, step S73 is performed for using the block analyzing unit 12 to execute the first classification of the blocks in accordance with the visional characteristics of the blocks; Then, step S74 is performed for analyzing the classified blocks by the vision identifying unit 13 so as to determine the functions of the blocks on the web page. Then, step S75 is performed for outputting the analyzed result by the output unit 14. The detail of each step is further discussed in the following.

In step S71, it is preferred that the system 1 receives web page information from an external input, and the information can be an image of a web page, but not limited to it. More specifically, the system 1 can get the image of the web page by an external camera, or the system 1 catches the web page image by executing program. In this embodiment, the system 1 is preferred to use the image analyzing unit 11 to obtain the image of the web page, but not limited to it.

Step S72 is used to segment the web page into a plurality of blocks by the image analyzing unit 11, and the detail of this step is similar to step S22.

Step S73 is performed for executing the first classification of the blocks, which determines whether the blocks are input box, dropdown menu or noise block by visional characteristics. Please refer to FIGS. 8(*a*) and 8(*b*), the block analyzing unit 12 relies on the current edge detection or feature detection techniques, and follows the conditions in the followings to determine the attributes of the blocks:

(a) the block is rectangle shape including some blank regions 81, and the blank regions 81 are rectangle shape;

(b) the surroundings of the rectangle shape blank regions 81 have significant separator lines 82;

(c) there are prompting texts 83 in the block; and (d) there are images of the buttons that can be clicked in the blocks.

Figure 8A:
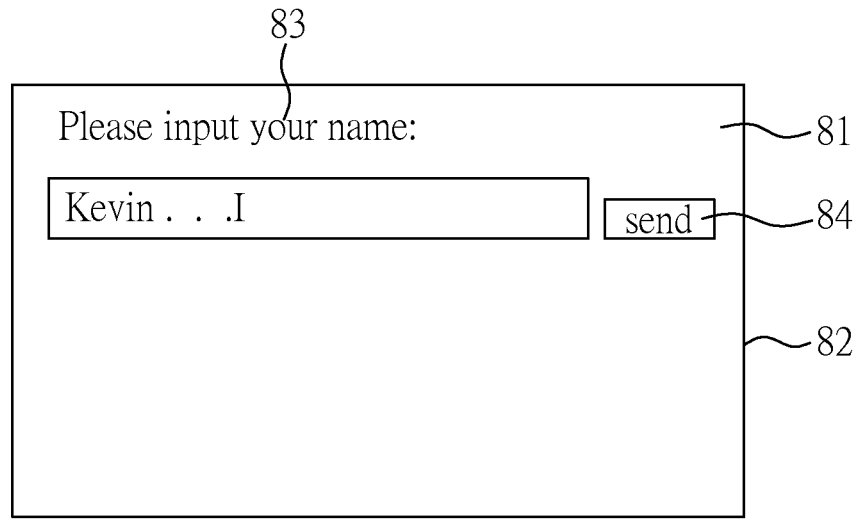
FIG. 8(a) is a schematic diagram of a input box.
Figure 8B:
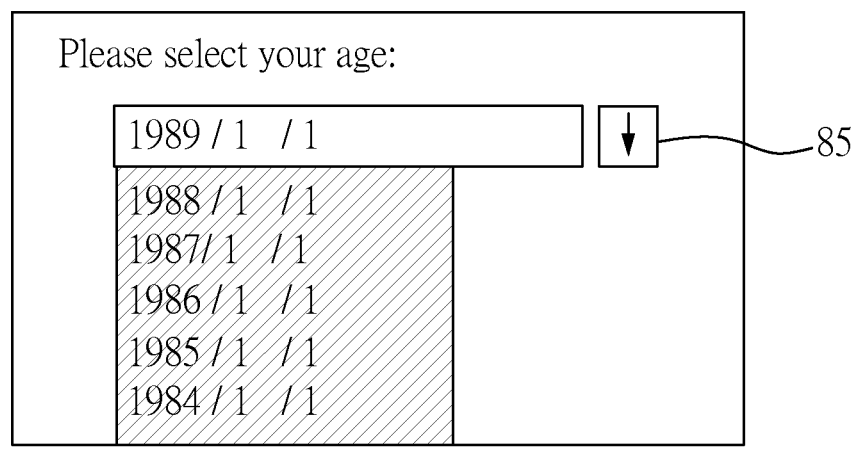
FIG. 8(b) is a schematic diagram of a dropdown menu.

It is preferred that, if a block satisfies at least one of the aforementioned conditions, the block is determined as a input box by the block analyzing unit 12, as shown in FIG. 8(*a*).

(e) If the block is input box, then it determines whether there is at least an indicating arrow 85 in the rectangle shape blank regions 81 and, if yes, the block analyzing unit 12 determines that the block is a dropdown menu, as shown in FIG. 8(*b*).

If the block analyzing unit 12 uses current edge detection or feature detection techniques, but fails to find any text or picture in the block, or numbers or sizes of the texts or pictures are lower than a setting value, or the block is too small, then the block analyzing unit 12 determines that the block is a noise block.

As a result, the step S73 can be completed, and at least three attributes of the web blocks can be determined so that the whole analysis can be more accurate.)

Step S74 is used to determine the function of each block in the web page. This step is executed by the vision identifying unit 13 for comparing at least a relative feature of each block to determine the function of each block on the web page, wherein the functions are preferred to be classified to main content, advertisement and navigation functions. As shown in FIG. 5, the vision identifying unit 13 compares the position feature of each block in the web page to determine the relative position of each block. The relative positions can be classifies into a relative center position, a relative edge position or relative side position of the web page. Due to the important main contents being usually located at the center of a web page, the advertisements being located at the edge, and the navigation menus being located at two sides of the web page, this step applies the block positions as the determination basis. Then, the vision identifying unit 13 compares the size feature of each block to determine the relative size of each block. Because a bigger block is usually composed by the main contents, and a smaller block is composed by advertisements or navigation menus, this step applies the block sizes as the determination basis. Then, the vision identifying unit 13 determines the functions of the blocks in the web page. If the block is relatively big and is located at the relative center position of the web page, the block is defined as the main content block by the vision identifying unit 13. Besides, if the block with high TR is located at the top position of the web page, the block can also be defined as the main content block. If the block is smaller than the main content block, and is located at an edge of the web page, the block is defined as the advertisement block. If the block is vertically located at the left or right side of the web page or is horizontally located at the top or bottom of the web page, the block is defined as the navigation menu block.

Beside, in Step S74, it can use more image identifying rules to determine the function of each block according to step S73. For example, the input box is on the position above the web page, it can be determined as a searching function block. Thus if the more classifications of the blocks can be determined in step S73, the more functions of the blocks can be determined in step S74.

In addition, the vision identifying unit 13 can apply different features for determination. According to another embodiment, the vision identifying unit 13 compares data appearance feature of each block to determine the relative appearance type of each block. Typically, the fonts and font sizes are similar for the texts in the main content block. As shown in FIG. 6 which is a schematic diagram of a web page, the fonts and font sizes of a main content block 61 are the same. For distinguishing from the main content block, the advertisement block usually has different fonts or font sizes in comparison with the main content block, e.g. an advertisement block 62 as shown in FIG. 6. The navigation menu block usually has similar fonts or font sizes in comparison with the main content block. In order to distinguish the navigation menu block from the main content block, this embodiment can be combined with step S51 or S52 to distinguish the navigation menu block from the main content block. As the navigation menu block 63 shown in FIG. 6, it has similar fonts and sizes, and is located at the left side of the web page. Therefore, this embodiment can be used to accurately determine the functions of the blocks in the web page.

In another embodiment, the vision identifying unit 13 can also analyze the functions of the blocks by a pattern recognition method, wherein the pattern recognition method is employed to compare the layouts of the objects of the web. For example, a navigation menu is usually composed by a plurality of objects with relative visional characteristics, wherein the objects regularly arranged on the web. Thus, a block with a series of texts with same size and color alternately arranged on the web will be determined as a navigation menu.

Then, step S75 is performed, with which the output unit 14 collects the blocks and the functions of the blocks into an information interface, and outputs the information interface to the user. The information interface is preferred to be an HTML or a picture format, but it can also be other file formats.

In view of the foregoing, it is known that the present invention provides a visual web page analysis system and method which can analyze the data of web page and functions based on visual habits of the user, so as to improve the accuracy of the analysis and achieve the analysis of the whole web page, thereby allowing the analysis to have extensive applicability.

Although the present invention has been explained in relation to its preferred embodiment, it is to be understood that many other possible modifications and variations can be made without departing from the spirit and scope of the invention as hereinafter claimed.

What is claimed is:

1. A visual web page analysis system for analyzing data of a web page based on vision, the system comprising:
    a processor;
    an image analyzing program executed by a processor to enable a processor to load information of a web page and to segment content of the web page into a plurality of blocks based on at least a visual feature of the web page;
    a block analyzing program executed by the processor to enable the processor to classify the plurality of blocks based on at least an attribute of each block;
    a vision identifying program executed by the processor to enable the processor to compare at least a relative feature of each block to determine a function of each classified block on the web page; and
    an output program executed by the processor to enable the processor to collect the plurality of blocks and their functions into an information interface and to output the information interface,
    wherein the processor provides an analyzed result shown on the information interface, and
    wherein the block analyzing program executed by the processor further enables the processor to receive a plurality of web page tags, to determine the attribute of each block in accordance with the following formulas for Degree of Picture Hyperlink (DoPH), Picture Text Ratio (PTR), Degree of Local Text Hyperlink (DoLTH), Text Ratio, and Degree of Local Picture Hyperlink (DoLPH):
    (DoTH)=(number of text hyperlinks in the block)/(number of text tags in the block), where a text tag is any HTML grammar instruction that can be used to present texts;
    (DoPH)=(number of picture hyperlinks in the block)/(number of picture tags in the block), where a picture tag is any HTML grammar instruction that can be used to present pictures;
    Text Ratio=(number of characters in the block)/(number of characters in the web page);
    (PTR)=(number of image tags in the block)/(number of text tags in the block), where the PTR is used to measure a pictures-versus-text ratio in the block;
    (DoLTH)=(number of local text hyperlinks in the block)/(number of text hyperlinks in the block), where the local text hyperlinks are text hyperlinks linked to the same web domain; and
    (DoLPH)=(number of local picture hyperlinks in the block)/(number of picture hyperlinks in the block), where the local picture hyperlinks are picture hyperlinks linked to the same web domain.

2. The visual web page analysis system as claimed in claim 1, wherein the image analyzing program includes an image processing program executed by the processor to enable the processor to perform an image processing to distinguish texts and pictures from the web page.

3. The visual web page analysis system as claimed in claim 1, wherein the image analyzing program further includes an image segment and composition program executed by the processor to enable the processor to compose texts and pictures with a related visual feature into a block based on at least one visual feature.

4. The visual web page analysis system as claimed in claim 2, wherein the image analyzing unit further includes a block checking program executed by the processor to enable the processor to use a position of an auxiliary object to check whether the plurality of blocks are segmented correctly or not.

5. The visual web page analysis system as claimed in claim 4, wherein the auxiliary object is a separator line on the web page.

6. The visual web page analysis system as claimed in claim 1, wherein the block analyzing unit program enables the processor to determine the attribute of each block in accordance with HTML codes of the block.

7. The visual web page analysis system as claimed in claim 1, wherein the block analyzing unit program enables the processor to determine whether the attribute of each block is input box or dropdown menu in accordance with a visual characteristic of the block.

8. The visual web page analysis system as claimed in claim 1, wherein the relative feature includes relative positions of the plurality of blocks.

9. The visual web page analysis system as claimed in claim 8, wherein the relative feature further includes sizes of the plurality of blocks.

10. The visual web page analysis system as claimed in claim 1, wherein the relative feature further includes layouts of objects of the plurality of the blocks.

11. The visual web page analysis system as claimed in claim 1, wherein the relative feature further includes visual characteristics of the objects of the blocks.

12. A visual web page analysis method executed by a processor for analyzing data of a web page based on vision, comprising the steps of:
    (a) loading information of a web page;
    (b) segmenting content of the web page into a plurality of blocks based on at least a visual feature of the web page;
    (c) classifying the plurality of blocks based on at least an attribute of each block;

(d) comparing at least a relative feature of each block to determine a function of each classified block on the web page; and (e) collecting the plurality of blocks and their functions into an information interface, and outputting the information interface, wherein step (d) further includes: receiving a plurality of web page tags, to determine the attribute of each block in accordance with the following formulas for Degree of Picture Hyperlink (DoPH), Picture Text Ratio (PTR), Degree of Local Text Hyperlink (DoLTH), Text Ratio, and Degree of Local Picture Hyperlink (DoLPH):

(DoTH)=(number of text hyperlinks in the block)/(number of text tags in the block), where a text tag is any HTML grammar instruction that can be used to present texts;

(DoPH)=(number of picture hyperlinks in the block)/(number of picture tags in the block), where a picture tag is any HTML grammar instruction that can be used to present pictures;

Text Ratio=(number of characters in the block)/(number of characters in the web page);

(PTR)=(number of image tags in the block)/(number of text tags in the block), where the PTR is used to measure a pictures-versus-texts ratio in the block;

(DoLTH)=(number of local text hyperlinks in the block)/(number of text hyperlinks in the block), where the local text hyperlinks are text hyperlinks linked to the same web domain; and (DoLPH)=(number of local picture hyperlinks in the block)/(number of picture hyperlinks in the block), where the local picture hyperlinks are picture hyperlinks linked to the same web domain.

13. The visual web page analysis method as claimed in claim 12, wherein step (b) further includes: performing an image processing to distinguish texts and pictures from the web page.

14. The visual web page analysis method as claimed in claim 11, wherein step (b) further includes: composing texts and pictures with a related vision feature into a block.

15. The visual web page analysis method as claimed in claim 12, wherein the step (b) further includes: using a position of an auxiliary object to check whether the plurality of blocks are segmented correctly or not.

16. The visual web page analysis method as claimed in claim 15, wherein the auxiliary object is a separator line on the web page.

17. The visual web page analysis method as claimed in claim 12, wherein the relative feature in step (d) includes relative positions of the plurality of blocks.

18. The visual web page analysis method as claimed in claim 12, wherein the relative feature further includes sizes of the plurality of blocks.

19. The visual web page analysis method as claimed in claim 12, wherein the information interface is a picture.

20. The visual web page analysis method as claimed in claim 12, wherein the information interface is a web page.

* * * * *